(12) United States Patent
Mehta et al.

(10) Patent No.: US 6,413,305 B1
(45) Date of Patent: Jul. 2, 2002

(54) THERMOCHROMIC INK COMPOSITION

(75) Inventors: Rajendra Mehta, Dayton; Richard L. Shields, Centerville; Aurelia Gloria W. Kalman, Vandalia, all of OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/498,669

(22) Filed: Feb. 7, 2000

(51) Int. Cl.[7] .............................................. C09D 11/00
(52) U.S. Cl. ............................... 106/31.41; 106/31.58; 106/31.86; 106/31.73
(58) Field of Search ........................ 106/31.41, 31.58, 106/31.86, 31.73

(56) References Cited

U.S. PATENT DOCUMENTS 5,591,255 A * 1/1997 Small et al. ............. 106/31.61
6,139,779 A * 10/2000 Small et al. ................. 252/583

* cited by examiner

*Primary Examiner*—C. Melissa Koslow
*Assistant Examiner*—Veronica F. Faison
(74) *Attorney, Agent, or Firm*—Killworth, Gottman, Hagan & Schaeff, L.L.P.

(57) ABSTRACT

A thermochromic ink composition is provided for use on security documents such as checks which provides a reversible color change in response to heat. The ink composition includes a thermochromic aqueous slurry and an ink vehicle comprising either a phenolic modified rosin and a compatible oil, a styrene maleic anhydride resin and a glycol, or an acrylic resin varnish. The ink composition is printed on at least a portion of a substrate using letterpress printing methods and provides enhanced adhesion to toner when applied to areas of a substrate which are subsequently printed with a non-impact printing device such as a laser printer.

16 Claims, 1 Drawing Sheet

THERMOCHROMIC INK COMPOSITION

BACKGROUND OF THE INVENTION

This invention relates to a thermochromic ink composition which is provided on a security document, and more particularly, to a thermochromic ink composition, which, when applied to selected areas of a substrate, provides enhanced adhesion of toners which are subsequently printed onto those areas of the substrate with a non-impact printing device.

The use of thermochromic inks in the art is known. Such inks typically comprise an electron-donating chromogenic substance, an electron-accepting substance, and a solvent which undergo a reversible color change in response to a change in the ambient temperature, for example, from ambient to freezing or from ambient to elevated temperatures. The color change which takes place may be a change from one color to another, from colored to colorless, or from colorless to colored. Thernochromic inks have frequently been used to provide security features on documents such as checks and other business forms. For example, documents may be provided with an area or areas which will change color upon exposure to a temperature change such that the authenticity of the document may be verified or so that anti-copy protection is provided.

Documents printed with thermochromic inks are often subsequently imaged with non-impact printers such as laser, ink jet, and ion deposition printers or impact printers to provide variable or non-variable information. However, a problem has existed with providing images on security documents with non-impact printers as it has been difficult to achieve satisfactory toner bonding on paper products used to make such security documents. And, because of the lack of strong adherence of toner to paper, documents printed by non-impact printers are often subject to deliberate alteration by counterfeiters. It would be desirable to be able to provide thermochromic inks on a document as well as to be able to add additional printed information with a non-impact printer while avoiding the problem of inadvertent or intentional toner removal to provide an added security feature.

Accordingly, there is still a need in the art for a thermochromic ink which may be printed on a document as well as a need for providing good toner adhesion to indicia subsequently printed by non-impact printers onto areas previously printed with the thermochromic ink.

SUMMARY OF THE INVENTION

The present invention meets that need by providing a thermochromic ink composition which is applied to a security document by a letterpress printing method and which provides enhanced toner adhesion when areas of the document containing the thermochromic ink are subsequently printed by a non-impact printing device such as a laser printer.

According to one aspect of the present invention, a security document is provided which comprises a substrate having first and second surfaces in which a thermochromic ink composition is applied to at least a portion of the first or second surface. The ink composition provides a color change in response to a change in temperature. The thermochromic ink composition also provides enhanced adhesion for toner particles which are subsequently printed on the substrate.

The thermochromic ink composition preferably comprises a thermochromic aqueous slurry and an ink vehicle, where the thermochromic aqueous slurry preferably comprises particles of an encapsulated thermochromic pigment dispersed in a water-based slurry. The ink vehicle is selected from the group consisting of 1) a phenolic modified rosin and an oil compatible with the rosin, 2) at least one styrene maleic anhydride resin and a glycol, or 3) an acrylic resin varnish.

In one embodiment of the invention, the ink vehicle comprises a phenolic modified rosin and an oil compatible with the rosin. The rosin has preferably been modified with formaldehyde and pentaerythritol. The oil is preferably selected from the group consisting of tall oil, linseed oil, and combinations thereof. In one embodiment, the thermochromic ink composition preferably comprises from about 20 to 45% by weight of the thermochromic aqueous slurry, from about 25 to 50% by weight of the phenolic modified rosin, from about 25 to 45% by weight tall oil, and from about 0 to 25% by weight linseed oil. In an alternative embodiment, the thermochromic ink composition preferably comprises from about 20 to 45% by weight of the thermochromic aqueous slurry, from about 20 to 50% by weight phenolic modified rosin, and from about 20 to 45% by weight tall oil. The composition preferably further comprises from about 1 to 25% by weight linseed oil.

In an alternative embodiment of the invention, the ink vehicle comprises at least one styrene maleic anhydride resin and a glycol. In this embodiment, the thermochromic ink composition preferably comprises from about 15 to 45% by weight of the thermochromic aqueous slurry and from about 30 to 75% by weight of the ink vehicle. The ink composition preferably further comprises from about 1 to 10% by weight triethanolamine, and from about 1 to 10% by weight propylene glycol.

In yet another alternative embodiment of the invention, the ink vehicle comprises an acrylic resin varnish. In this embodiment, the thermochromic ink composition preferably comprises from about 15 to 25% by weight of a styrene maleic anhydride resin/glycol vehicle, 30 to 50% by weight of the acrylic resin varnish, from about 20 to 45% by weight of the thermochromic aqueous slurry, and from about 10 to 30% by weight linseed oil. The ink composition preferably further comprises from about 1 to 6% by weight triethanolamine, and from about 1 to 5% by weight soybean oil.

The thermochromic ink composition is preferably provided on a security document by applying the composition onto at least a portion of the first or second surface of a substrate. Toner is then printed over at least a portion of the area of the first or second surface containing the thermochromic ink composition. Preferably, the thermochromic ink composition is applied to the substrate by a letterpress printing process.

The thermochromic ink composition of the present invention thus provides a dual function in that it provides a color change in response to a change in temperature as well as providing enhanced adhesion of toner particles to a substrate.

Accordingly, it is a feature of the present invention to provide a thermochromic ink composition for use on security documents which provides a color change in response to a change in temperature and which also provides enhanced toner adhesion when the substrate is subsequently printed with a non-impact printing device. Other features and advantages of the invention will be apparent from the following description, the accompanying drawing, and the appended claims.

DETAILED DESCRIPTION OF THE PREFERRED EMBODIMENT

Figure 1:
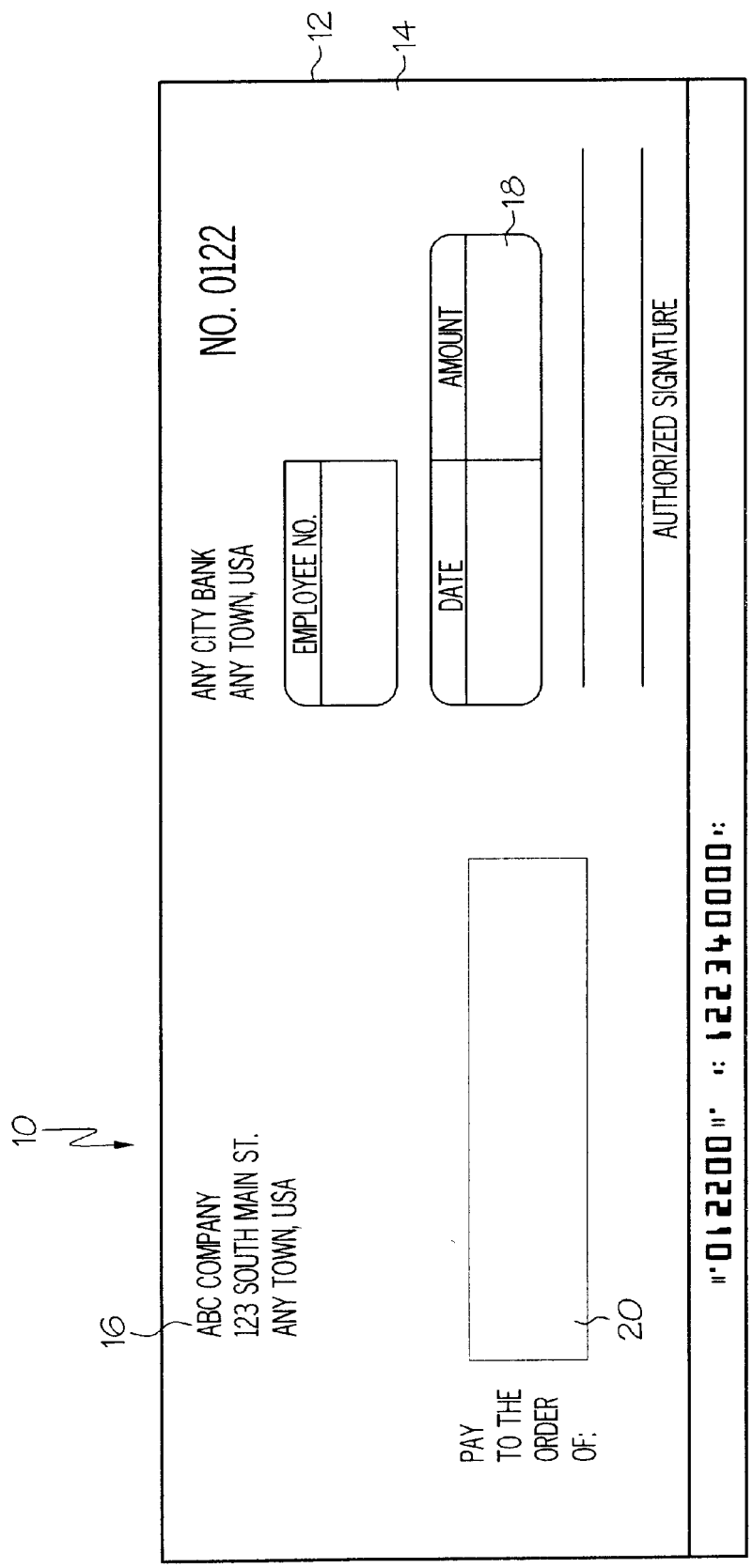
FIG. 1 is a front elevation view of a security document which has been printed with the thermochromic ink composition of the present invention.

The thermochromic ink composition of the present invention may be applied to security documents such as checks, money orders, negotiable certificates or other documents of value as well as business forms, or other documents in which it is desirable to provide a color change for authentication or other purposes.

The thermochromic ink composition preferably comprises a) a thermochromic aqueous slurry, and b) an ink vehicle selected from the group consisting of 1) a phenolic modified rosin and an oil compatible with the rosin, 2) at least one styrene maleic anhydride resin and a glycol, or 3) an acrylic resin varnish. While not wishing to be bound to any specific theory or mechanism, it is believed that the enhanced toner adhesion provided by the ink composition results from the use of an ink vehicle containing either a phenolic modified rosin, a maleic anhydride resin, or an acrylic resin.

The preferred ink vehicle for use in the present invention comprises a phenolic modified rosin (modified with formaldehyde and pentaerythritol) and an oil which is compatible with the rosin. A preferred phenolic modified rosin is available from Akzo Nobel Resins, Mendham, N.J., under the designation SPR-10. Suitable compatible oils include tall oil and linseed oil. The tall oil is preferably a tall oil fatty acid ester available from Arizona Chemical, Panama City, Fla., under the designation SYLFAT® 9012. The linseed oil is preferably an alkali refined linseed oil obtained from Degen Oil Chemical, Jersey City, N.J., under the designation P-1037 Supreme Linseed oil.

An alternative ink vehicle which is suitable for use in the present invention comprises at least one styrene maleic anhydride resin and a glycol. Preferred styrene maleic anhydride resin vehicles are commercially available from Kustom Blending, Inc., Florence Ky. under the designations KS-153 and KS-100. Such vehicles comprise styrene maleic anhydride resins dissolved in glycol with a small amount of amine. The KS-100 vehicle further includes urea.

When such vehicles are used, the ink composition preferably further includes an amount of propylene glycol and optionally, an amine, preferably triethanolamine.

Another alternative ink vehicle which may be used in the thermochromic composition of the present invention is an acrylic resin varnish. A preferred acrylic resin varnish is commercially available from Ron Ink under the designation "Laser Safe Sheet-fed Varnish-24809 MQ5" and includes an acrylic resin, an aliphatic oil, a pigment or filler, wax, and soybean oil. When such a vehicle is used, the ink composition preferably further includes an amount of the styrene-maleic anhydride resin vehicle described above, an amine, and an oil such as linseed oil and/or soybean oil.

The thermochromic aqueous slurry included in the ink composition may be obtained from a number of commercial suppliers and preferably comprises particles of an encapsulated thermochromic pigment dispersed in a water-based slurry. A preferred thermochromic aqueous slurry for use in the present invention is commercially available from Neil Brothers Ltd., Birmingham, United Kingdom, under the designation AQ Type 25 or AQ Type 42. The aqueous slurry may be formulated so as to provide a variety of color changes. Preferably, the thermochromic aqueous slurry provides a reversible color change from colored to colorless which occurs at a temperature range of between about 85° F. and 125° F. Depending on the dyes included in the thermochromic slurry, the color change may be from a first color to a second color. For example, by adding a non-thermochromic yellow dye with a thermochromic red slurry, the color appears orange at ambient temperature, then changes to yellow at elevated temperatures. By mixing blue thermochromic slurry with a non-thermochromic yellow dye, a color change will occur from green to yellow. By mixing blue thermochromic slurry with a non-thermochromic red dye, the color change will be from purple to red. A variety of other thermochromic aqueous slurries can be mixed with non-thermochromic dyes as described above to cause a color to color change. Such slurries include blue, gray, pink, red, orange and purple.

The thernochromic ink composition is preferably made by first preparing the ink vehicle, then adding the pre-mixed thermochromic aqueous slurry to the ink vehicle. In a preferred method, a solution of phenolic modified rosin is prepared at 52–53% concentration in a tall oil fatty acid ester. The liquid tall oil fatty acid ester is added to a kettle at room temperature and then heated to 135–140° C. while the phenolic modified rosin is slowly added with stirring. Once in solution, the hot mixture is filtered through 150 micron mesh and cooled. The thermnochromic aqueous slurry is then added to the resin solution while mixing, which solution is preferably warmed to about 55° C.

The thermochromic ink composition is generally applied to a document substrate by any suitable letterpress printing process. Letterpress processes permit greater quantities of ink to be applied to a substrate than lithographic processes, resulting in more vibrant, contrasting color responses. The composition may be applied in selected areas which can form blocks of color, or they may be applied so as to form images, numbers, letters, symbols, or other indicia. The composition may be selectively printed on the surface of stock papers during the manufacturing process, and may be applied to one or both sides of the substrate. The substrate may comprise any suitable paper substrate including bond papers, calendared papers, safety papers, and opaque white papers.

With reference to the drawing, it must be appreciated that Patent Office requirements for solid black line drawings on a white surface make illustration of some of the subtleties of our invention relating to different colors difficult by the required Patent Office drawings alone. Reference to the following detailed description of the illustration will make full appreciation of the drawing and our invention possible.

Referring now to FIG. 1, a security document 10 is illustrated in the form of a check comprising a substrate 12 having a first surface 14, with selected portions which have been printed with the thermochromic ink composition of the present invention. The ink has been printed as the company name and address 16, and in areas 18 and 20 which may be subsequently printed with the check amount and payee information. By providing the thermochromic ink composition in areas 18 and 20, the information subsequently printed using toner in those areas with a non-impact printer will exhibit increased adhesion to the substrate. In addition, the authenticity of the document may be verified in those areas by subjecting the document to a change in temperature so that a color change can be observed. For example, heat from a finger held on a portion of the thermochromic ink printed document for a few seconds may be sufficient to initiate a reversible color change to verify authenticity. Other potential uses for the thermochromic ink composition of the present invention will be apparent to those skilled in the art. The thermochromic ink composition may be printed on selected portions of a document in a number of patterns, depending on the desired application. It should be appreciated that many different combinations for placement of the ink composition on a security document are possible and are within the scope of this invention.

While the thermochromic ink composition of the present invention provides areas of a document with enhanced toner adhesion when printed by non-impact printing devices, it should be appreciated that the document surface is also receptive to being printed by a variety of conventional impact printing devices using ink or transfer ribbons.

In order that the invention may be more readily understood, reference is made to the following examples which are intended to illustrate the invention, but not limit the scope thereof.

Example 1

The following formulas illustrate thermochromic ink compositions prepared using an ink vehicle comprising a phenolic modified resin and an oil in accordance with the present invention:

Formula 1

| | Weight % |
|---|---|
| Phenolic modified rosin[1] | 35.6 |
| Tall oil fatty acid ester[2] | 31.8 |
| Thermochromic aqueous slurry[3] | 32.6 |

[1]SPR-10 from Akzo Nobel Resins, Mendham, New Jersey
[2]SYLFAT ® 9012 from Arizona Chemical, Panama City, Florida
[3]AQ-25 from Neil Brothers Ltd., Birmingham, United Kingdom Formula 2

| | Weight % |
|---|---|
| Phenolic modified rosin[1] | 36.9 |
| Tall oil fatty acid ester[2] | 24.6 |
| Alkali refined linseed oil[3] | 7.5 |
| Thermochromic aqueous slurry[4] | 31.0 |

[1]SPR-10 from Akzo Nobel Resins, Mendham, New Jersey
[2]SYLFAT ® Arizona Chemical, Panama City, Florida
[3]P-1037 from Degen Oil Chemical, Jersey City, New Jersey
[4]AQ-25 from Neil Brothers Ltd., Birmingham, United Kingdom Formula 1 above was tested to determine its toner adhesion enhancing capabilities on a 20# bond substrate. The substrate was printed with a Lexmark 4039 printer using conventional toner available from Lexmark. The tapes used for the test were 3M 811 removable tape and 3M 610 permanent tape. The tape was applied over the toner images in areas containing the thermochromic ink as well as uncoated imaged areas. The tape was smoothed down with a 1 pound roller (force of about 1 lb/in.$^2$) and removed after about 5 seconds of adhesion. Toner transfer to the tape was then observed subjectively. It was clear that less toner was removed in areas containing the thermochromic ink than in those areas which did not contain the ink.

Example 2

The following formulas illustrate thermochromic ink compositions prepared using a styrene maleic anhydride resin ink vehicle in accordance with the present invention:

Formula 1

| | Weight % |
|---|---|
| KS-153[1] | 41.67 |
| KS-100[2] | 13.89 |
| Propylene glycol | 6.66 |
| Thermochromic aqueous slurry[3] | 26.67 |
| Sucrose acetate isobutyrate[4] | 11.11 |

[1]Styrene maleic anhydride resin vehicle from Kustom Blending, Inc., Florence, Kentucky
[2]Styrene maleic anhydride resin vehicle from Kustom Blending, Inc., Florence, Kentucky
[3]AQ-25 from Neil Brothers Ltd., Birmingham, United Kingdom
[4]Eastman Chemical Co., Kingsport, Tennessee Formula 2

| | Weight % |
|---|---|
| KS-153[1] | 71 |
| Thermochromic aqueous slurry[2] | 24 |
| Triethanolamine | 5 |

[1]Styrene maleic anhydride resin vehicle from Kustom Blending, Inc., Florence, Kentucky
[2]AQ-25 from Neil Brothers Ltd., Birmingham, United Kingdom Formula 3

| | Weight % |
|---|---|
| KS-153[1] | 63 |
| Propylene glycol | 4 |
| Thermochromic aqueous slurry[2] | 26 |
| Triethanolamine | 3 |
| Slip dispersion[3] | |

[1]Styrene maleic anhydride resin vehicle from Kustom Blending, Inc., Florence, Kentucky
[2]AQ-25 from Neil Brothers Ltd., Birmingham, United Kingdom
[3]AC-407 from Aqueous Concepts, Tampa, FL Example 3

The following formula illustrates a thermochromic ink composition prepared using an ink vehicle comprising an acrylic resin varnish in accordance with the present invention:

Formula 1

| | Weight % |
|---|---|
| KS-153[1] | 17.09 |
| 24809 MQ5[2] | 25.10 |
| Thermochromic aqueous slurry[3] | 25.65 |
| Linseed oil | 25.13 |
| Triethanolamine | 4.27 |
| Soy bean oil | 1.71 |
| Slip Dispersion[4] | 1.05 |

[1]Styrene maleic anhydride resin vehicle from Kustom Blending, Inc., Florence, Kentucky
[2]Acrylic resin varnish from Ron Ink
[3]AQ-25 from Neil Brothers Ltd., Birmingham, United Kingdom
[4]AC-407 from Aqueous Concepts, Tampa, Florida Formula 1 above was tested to determine its toner adhesion enhancing capabilities on the following cellulosic substrates: 24# bond from International Paper; 24# bond from Union Camp, and 20# bond from Unisource. The first substrate was printed using a Xerox Docutec printer. The second substrate was printed with a Lexmark 4039. The third substrate was printed using a Hewlett Packard Laserjet 6HP printer using conventional toner in cartridges available from the respective printer companies.

The tapes used for the test were 3M 811 (standard Scotch Magic Tape®) and 3M 610 permanent tape. The tape was applied over toner images in areas containing the thermochromic ink as well as over uncoated imaged areas. The tape was smoothed down with a force of about 1 lb/in.$^2$ and removed after about 5 seconds of adhesion. Toner transfer to the tape was then observed subjectively. Estimated toner transfer of coated areas in all samples was less than 2% transfer. In addition, it was observed that less toner was removed in areas containing the thermochromic ink than in uncoated areas.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A thermochromic ink composition comprising:
   a) a thermochromic aqueous slurry, and
   b) an ink vehicle selected from the group consisting of: 1) a phenolic modified rosin and an oil compatible with said rosin, 2) at least one styrene maleic anhydride resin and a glycol, or 3) an acrylic resin varnish in combination with a styrene maleic anhydride resin vehicle.

2. A thermochromic ink as claimed in claim 1 wherein said thermochromic aqueous slurry comprises particles of an encapsulated thermochromic pigment dispersed in a water-based slurry.

3. A thermochromic ink as claimed in claim 1 wherein said oil is selected from the group consisting of tall oil, linseed oil, and combinations thereof.

4. A thermochromic ink composition as claimed in claim 1 wherein said ink vehicle comprises a phenolic modified rosin and an oil compatible with said rosin.

5. A thermochromic ink composition as claimed in claim 4 comprising from about 20 to 45% by weight of said thermochromic aqueous slurry, from about 25 to 50% by weight of said phenolic modified rosin, from about 25 to 45% by weight tall oil, and from about 0 to 25% by weight linseed oil.

6. A thermochromic ink composition as claimed in claim 4 comprising from about 20 to 45% by weight of said thermochromic aqueous slurry, from about 20 to 50% by weight phenolic modified rosin, and from about 20 to 45% by weight tall oil.

7. A thermochromic ink composition as claimed in claim 6 further comprising from about 1 to 25% by weight linseed oil.

8. A thermochromic ink composition as claimed in claim 4 wherein said rosin has been modified with formaldehyde and pentaerythritol.

9. A thermochromic ink composition as claimed in claim 1 wherein said ink vehicle comprises said at least one styrene maleic anhydride resin and a glycol.

10. A thermochromic ink composition as claimed in claim 9 comprising from about 15 to 45% by weight of said thermochromic aqueous slurry and from about 30 to 75% by weight of said ink vehicle.

11. A thermochromic ink composition as claimed in claim 9 further comprising from about 1 to 10% by weight triethanolamine.

12. A thermochromic ink composition as claimed in claim 9 further comprising from about 1 to 10% by weight propylene glycol.

13. A thermochromic ink composition as claimed in claim 1 wherein said ink vehicle comprises an acrylic resin varnish in combination with a styrene maleic anhydride resin vehicle.

14. A thermoclromic ink composition as claimed in claim 13 comprising from about 15 to 25% by weight of said styrene maleic anhydride resin vehicle, form about 30 to 50% by weight of said acrylic resin varnish, from about 20 to 45% by weight of said thermochromic aqueous slurry, and from about 10 to 30% by weight linseed oil.

15. A thermochromic ink composition as claimed in claim 14 further comprising from about 1 to 6% by weight triethanolamine.

16. A thermochromic ink composition as claimed in claim 14 further comprising from about 1 to 5% by weight soybean oil.

* * * * *

UNITED STATES PATENT AND TRADEMARK OFFICE
CERTIFICATE OF CORRECTION

PATENT NO.      : 6,413,305 B1
DATED           : July 2, 2002
INVENTOR(S)     : Mehta et al.

It is certified that error appears in the above-identified patent and that said Letters Patent is hereby corrected as shown below:

Column 1,
Line 20, "thernochromic" should be -- thermochromic --.

Column 4,
Line 19, "thernochromic" should be -- thermochromic --.
Line 28, "thermnochromic" should be -- thermochromic --.

Column 8,
Line 33, "form about" should be -- from about --.

Signed and Sealed this

Fourth Day of February, 2003

JAMES E. ROGAN
*Director of the United States Patent and Trademark Office*